United States Patent Office 3,547,843
Patented Dec. 15, 1970

3,547,843
FOAMED POLYOLEFIN COMPOSITIONS USING POLYAZIDOFORMAMIDES
Shigeto Suzuki, San Francisco, Calif., assignor to Chevron Research Company, San Francisco, Calif., a corporation of Delaware
No Drawing. Original application Apr. 27, 1967, Ser. No. 634,138. Divided and this application Sept. 29, 1969, Ser. No. 862,043
Int. Cl. C08f 47/10
U.S. Cl. 260—2.5                   3 Claims

ABSTRACT OF THE DISCLOSURE

Polyolefins are heated with polyazidoformamides to give foamed essentially non-crosslinked solid polyolefin compositions.

CROSS-REFERENCE TO RELATED APPLICATION

This application is a division of copending application Ser. No. 634,138, filed Apr. 27, 1967.

INVENTION BACKGROUND

This invention concerns novel polyazidoformamides and their use as foaming agents in polyolefins.

Polyazido compounds such as polysulfonazides and polyazidoformates have been made and used as cross-linking agents for poly-1-alkenes such as polypropylene. Further, they have been used in conjunction with conventional blowing agents to prepare foamed, cross-linked poly-1-alkene compositions.

INVENTION DESCRIPTION

In contrast to the previously reported polyazido compounds a unique group of azides has been discovered which do not cause significant cross-linking but are effective for foaming polyolefins. These novel azides are polyazidoformamides having the general formula:

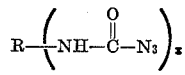

wherein $x$ is an integer greater than 1 and R is a polyvalent hydrocarbyl group of about 1 to about 30, preferably about 2 to 20 carbon atoms having a valence equal to $x$ in which the valences are on different carbon atoms of groups having more than 1 carbon atom. Preferably $x$ is an integer in the range of 2 and 4.

R in the above formula may be alkylene, alkenylene, cycloalkylene, cycloalkenylene, arylene, alkarylene or aralkylene. Examples of typical groups are ethylene, isopropylene, tetramethylene, hexamethylene, 1,4-hexylene, octamethylene, cyclohexylene, cyclohexenylene, phenylene, tolylene, xylylene, naphthylene, methylenediphenylene, ethylenediphenylene, methinetriphenylene and the like.

Exemplary polyazidoformamides having the above formula are ethylene-bis (azidoformamide), isopropylene-bis (azidoformamide), pentamethylene-bis (azidoformamide), 1,3-amylene-bis (azidoformamide), 1,3-cyclohexylene-bis (azidoformamide), phenylene-bis (azidoformamide), p-tolylene-bis (azidoformamide), m- and p-xylylene-bis (azidoformamide), 1,3,7 - naphthylene-tris (azidoformamide), methylenedi - p-phenylene-bis (azidoformamide), and methinetri-p-phenylene-tris (azidoformamide).

The novel polyazidoformamides of this invention may be prepared by reacting a hydrocarbyl polyisocyanate with hydrazoic acid. The hydrocarbyl group of the polyisocyanate corresponds to R in the above formula. The relative proportion of these reactants is not critical. Normally they will be reacted in amounts approximating stoichiometric proportions. Preferably a slight excess of polyisocyanate will be used. The reactants will conventionally be mixed by dissolving the polyisocyanate in a solution of hydrazoic acid in an inert solvent such as a chloroform, carbon tetrachloride, benzene, xylene and the like. This reaction may be carried out at temperatures in the range of about 0 to 50° C., preferably at ambient temperature. It will normally be complete within 2 to about 72 hours. The crude polyazidoformamide may be removed from the solvent at temperatures below the decomposition temperature of the polyazidoformamide under subatmospheric pressure. These compounds may be purified by conventional methods such as recrystallization.

In general, these polyazidoformamides are colorless crystalline solids which decompose or melt with decomposition above about 110° C., usually about 130 to 200° C. Nitrogen is evolved as these compounds decompose.

UTILITY

The polyazidoformamides of this invention may be used to prepare foamed solid polyolefin compositions. They may be used for this purpose with solid polyolefins such as polystyrene, polyethylene, stereoregular polypropylene, poly-1-butene, polyvinylchloride, mixtures of such polyolefins and copolymers of polyolefins. Preferably, they will be used to prepare foamed compositions of stereoregular polypropylene.

Known techniques, which involve blending the polyolefin and polyazidoformamide and heating the blend to temperatures between the decomposition temperatures of the polyazidoformamide and the polyolefin, may be used to prepare these compositions. Normally about 0.1 to 10 weight percent polyazidoformamide, based on the polyolefin, is blended with the polyolefin. Blending may be accomplished by intimately mixing particulate polyolefin with particulate polyazidoformamide. This mixture will usually be heated coincidental to extruding or molding the mixture into useful objects.

Other components such as dyes, pigments, stabilizers, internal lubricants, fillers, etc., may also be blended with the polyolefin if desired.

EXAMPLES

The following examples illustrate the polyazidoformamides of this invention and their use as foaming agents with polyolefins. These examples are offered to illustrate this invention and are not meant to limit it in any way. Unless otherwise indicated, percentages are by weight.

EXAMPLE 1

A chloroform solution containing 0.00184 mole per ml. of hydrozoic acid was prepared from sodium azide and sulfuric acid. In this preparation a 1-liter flask was charged with 45.5 g. (0.7 mole) of sodium azide, 45.5 g. of warm water, and 210 ml. of chloroform. The resulting two-phase system was cooled in an ice acetone bath to about 0° C.; then 36 g. (0.35 mole) of sulfuric acid was slowly added while keeping the temperature in the range of 0–10° C. When all of the sulfuric acid had been added, the two phases were separated and the upper chloroform solution was found to contain $1.84 \times 10^{-3}$ moles/ml. of $HN_3$ in chloroform.

200 ml. of the above solution (0.368 mole of $HN_3$- and 16.8 g. (0.10 mole) of hexamethylene diisocyanate were charged to a flask and allowed to stand at room temperature in the dark for 60 hours. At the end of this time an infrared spectra of the solution indicated 95+% conversion of isocyanate.

The reaction liquid was mixed with chloroform to give a total volume of 700 ml. The small amount of insoluble matter was removed by filtration and found to weigh 1.7 g. The mother liquor was evaporated to about 100 ml. in volume by passing nitrogen over the surface. Upon warming all precipitated material was redissolved, and upon cooling to room temperature colorless crystals formed and were removed by filtration. Other crops of crystals were also obtained to give a total crude yield of 22.4 g. (88% yield) of hexamethylene-bis (azidoformamide). The melting point was 119–120° C. with evolution of small bubbles of gas. The crystals had the following analysis, calculated for $C_8H_{14}N_8O_4$ (percent): C, 37.8; H, 5.5; N, 34.1; O, 12.6. Found (percent): C, 38.0; H, 5.54; N, 43.87. Infrared analysis gave absorption at 3435, 2140, 1700, and 1500 cm.$^{-1}$.

EXAMPLE 2

A hydrozoic acid solution was prepared as described in Example 1. This solution contained 0.25 mole of $HN_3$ in 160 ml. of chloroform. This was mixed with 7.52 g. (0.04 mole) of m-xylylene diisocyanate dissolved in 20 ml. of chloroform. This mixture was allowed to stand for about 61 hours in the dark at ambient temperatures. At the end of this time an infrared analysis showed that the reaction was incomplete. Chloroform was stripped from the solution by blowing with nitrogen until a concentrated solution was obtained. Then 150 ml. of chloroform containing 0.26 mole of $HN_3$ was added and the mixture allowed to stand for an additional 54 hours. The insoluble, white crystals that formed during this time, 2.09 g., were removed by filtration. The mother liquor was evaporated to dryness to give 8.6 g. of residue. Recrystallization of the residue from benzene gave m-xylylene-bis (azidoformamide), having a melting point of 118–122° C. dec. The elemental analysis was as follows, calculated for $C_{10}H_{10}N_8O_2$ (percent): C, 43.8; H, 3.68; N, 40.9. Found (percent): C, 45.7; H, 3.9; N, 37.0. Infrared analysis gave absorption bands at 3425, 2151, 1699, and 1499 cm.$^{-1}$.

EXAMPLE 3

A chloroform solution containing 0.25 mole of hydrozoic acid in 150 ml. of chloroform was added to 6.29 g. (0.27 mole) of m-phenylene diisocyanate in a flask. This mixture was allowed to stand for about 15 days in the dark at room temperature. At the end of this time an infrared analysis indicated about 90% conversion of isocyanate groups. The chloroform was removed by passing nitrogen gas over the surface of the liquid at 30° C. The residual solid was dissolved in 50 ml. of ethanol which was then concentrated to 10 ml. Crystals formed slowly and after three days were removed by filtration. In this way 2.1 g. of crude m-phenylene-bis (azidoformamide) was recovered. In melting it started to decompose at about 135° C.; infrared analyses indicated that it was essentially all azide but that some unreacted isocyanate was also present.

EXAMPLE 4

A chloroform solution containing 0.24 mole of hydrozoic acid in 160 ml. of total volume was prepared as before. To this was added 7.5 g. (0.03 mole) of 4,4'-diphenylmethane diisocyanate contained in 150 ml. of dichloromethane. This mixture was stirred for about three days at room temperature. At the end of this time the solvent was stripped from the mixture by evaporation under nitrogen. The resulting crystalline residue, 8.55 g. (98% yield), was extracted for 16 hours with chloroform to give fine, pale yellow crystals of methylene di-p-phenylene-bis (azidoformamide). This compound appeared as a crystalline solid having no discernible melting point, but it began to decompose upon heating above 160° C. Elemental analysis calculated for $C_{15}H_{12}N_8O_2$ (percent): N, 33.3. Found (percent): N, 31.32. Infrared analysis gave absorptions at 3420, 2148, and 1690 cm.$^{-1}$.

EXAMPLE 5

43 g. of heptane insoluble polypropylene was mixed in a Brabender apparatus with 1% of some of the compounds prepared above. Mixing was continued at elevated temperatures until all of the azidoformamide compound had dissolved. The torque requirements for a constant mixing speed were measured. The results are given in Table I.

TABLE I

| Compound tested | Time, min. | Temp., °F. | Torque Start | Torque Finish |
| --- | --- | --- | --- | --- |
| Polypropylene | 8 | 350–400 | 2,500 | 1,180 |
| Product of Example: | | | | |
| 1 | 8 | 370–400 | 2,500 | 1,080 |
| 2 | 7 | 370–389 | 3,700 | 1,100 |
| 3 | 9 | 378–410 | 3,500 | 1,310 |

These results indicate that the compounds of this application cause foaming but not cross-linking of the polypropylene polymer. After incorporation of the azidoformamide compounds at these elevated temperatures, the polypropylene was a foamed article as indicated by the myriads of fine bubbles throughout the sample. These foamed samples were soluble in Decalin which also indicates that there is no cross-linking of the polypropylene.

EXAMPLE 6

Polyvinyl chloride containing 1 part of dioctyl phthalate and 0.03 part of tin stearate in 2 parts of polymer was mixed with representative compounds of this invention and then formed into a foamed product by heating at 225° F. for 10 minutes and 360° F. for 15 minutes. The results are given in Table II.

TABLE II

| Compound tested | Wt. percent of compound | Foam density, grams/cc. |
| --- | --- | --- |
| Polyvinyl chloride | | 1.13 |
| Product of Example: | | |
| 1 | 2.0 | 0.81 |
| 2 | 2.0 | 0.81 |
| 1 | 5.0 | 0.42 |
| 3 | 5.0 | 0.34 |
| 2 | 5.0 | 0.45 |

These results show that the compounds of this invention foam polyvinyl chloride to as much as 2 to 4 times its original volume. The thus foamed polyvinyl chloride samples are soluble in hot dimethyl formamide, indicating that no cross-linking has occurred.

As will be evident to those skilled in the art, various modifications on this invention can be made or followed, in the light of the foregoing disclosure and discussion, without departing from the spirit or scope of the disclosure or from the scope of the following claims.

I claim:
1. Method for preparing a foamed, essentially non-cross-linked solid polymer composition selected from the group consisting of polyolefin and polyvinylchloride which comprises admixing said solid polymer with about 0.1 to 10 weight percent of the compound having the formula

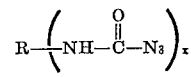

wherein x is an integer of 2 to 4 equal to the valence of R and R is a polyvalent hydrocarbyl radical of a hydrocarbon selected from the group consisting of alkanes, alkenes, cycloalkanes, cycloalkenes, arenes, alkarenes, and aralkanes, said R containing up to about 30 carbon atoms, and heating the mixture to a temperature in the range of the decomposition temperature of said compound and the decomposition temperature of the polymer.

2. Method of claim 1 in which the polyolefin is stereoregular polypropylene.

3. The mixture of solid polymer and compound of claim 1.

References Cited

UNITED STATES PATENTS

| | | | |
|---|---|---|---|
| 3,098,832 | 7/1963 | Pooley | 260—2.5(E) |
| 3,250,731 | 5/1966 | Buhl et al. | 260—2.5(E) |

MURRAY TILLMAN, Primary Examiner

WILBERT T. BRIGGS, Sr., Assistant Examiner

U.S. Cl. X.R.

260—82.8, 93.7, 94.9, 349